(12) United States Patent
Erdogan et al.

(10) Patent No.: US 12,675,426 B2
(45) Date of Patent: Jul. 7, 2026

(54) LOW POWER EMBEDDED USB2 (eUSB2) REPEATER

(71) Applicant: Texas Instruments Incorporated, Dallas, TX (US)

(72) Inventors: Mustafa Ulvi Erdogan, Allen, TX (US); Bharath Kumar Singareddy, Bangalore (IN); Suzanne Mary Vining, Plano, TX (US); Srijan Rastogi, Bengaluru (IN); Sirish Oruganti, New Delhi (IN); Douglas Edward Wente, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/502,418

(22) Filed: Oct. 15, 2021

(65) Prior Publication Data

US 2022/0206983 A1      Jun. 30, 2022

Related U.S. Application Data

(60) Provisional application No. 63/131,872, filed on Dec. 30, 2020.

(51) Int. Cl.
  G06F 13/40 (2006.01)
  G06F 13/42 (2006.01)
(52) U.S. Cl.
  CPC ...... G06F 13/4045 (2013.01); G06F 13/4282 (2013.01); G06F 2213/0042 (2013.01)

(58) Field of Classification Search
  CPC ............. G06F 13/4045; G06F 13/4282; G06F 2213/0042
  See application file for complete search history.

(56) References Cited

U.S. PATENT DOCUMENTS

| | | | |
|---|---|---|---|
| 2008/0084834 A1* | 4/2008 | Stanek ................. | G06F 13/385 |
| | | | 370/284 |
| 2013/0191568 A1* | 7/2013 | Hershko ............. | G06F 13/4295 |
| | | | 710/106 |
| 2013/0268789 A1* | 10/2013 | Yang ..................... | G06F 1/3287 |
| | | | 713/323 |
| 2014/0006654 A1* | 1/2014 | Chan ..................... | G06F 13/385 |
| | | | 710/16 |

(Continued)

*Primary Examiner* — Henry Tsai
*Assistant Examiner* — Harry Z Wang
(74) *Attorney, Agent, or Firm* — Xianghui Huang; Frank D. Cimino

(57) ABSTRACT

A method of operating an embedded universal serial bus (eUSB) repeater includes holding an eUSB receiver and a USB transmitter in active states and holding a USB receiver and an eUSB transmitter in standby states. The method includes receiving by the eUSB receiver a token packet indicative of transmission of a first downstream packet, and transitioning the USB receiver and the eUSB transmitter from the standby states to the active states responsive to the token packet. The method includes transmitting the token packet by the USB transmitter. The method includes receiving by the eUSB receiver a downstream packet or receiving by the USB receiver an upstream packet within a first timeout period after receiving the token packet, and transmitting the downstream packet by the USB transmitter or transmitting the upstream packet by the eUSB transmitter.

28 Claims, 7 Drawing Sheets

(56)  References Cited

U.S. PATENT DOCUMENTS

| | | | | |
|---|---|---|---|---|
| 2014/0006674 | A1* | 1/2014 | Chan | G06F 13/4221 |
| | | | | 710/313 |
| 2014/0237142 | A1* | 8/2014 | Jaussi | G06F 13/385 |
| | | | | 710/12 |
| 2015/0227489 | A1* | 8/2015 | Chen | G06F 13/385 |
| | | | | 710/313 |
| 2016/0162427 | A1* | 6/2016 | Kang | G06F 13/387 |
| | | | | 710/313 |
| 2016/0283423 | A1* | 9/2016 | Srivastava | G06F 13/4068 |
| 2016/0380747 | A1* | 12/2016 | Low | H04L 5/16 |
| | | | | 370/276 |
| 2017/0286360 | A1* | 10/2017 | Srivastava | G06F 13/4295 |
| 2018/0191523 | A1* | 7/2018 | Shah | H04B 3/36 |
| 2018/0278340 | A1* | 9/2018 | Maung | H04B 10/25 |
| 2018/0307293 | A1* | 10/2018 | Lambert | G06F 1/10 |
| 2019/0089624 | A1* | 3/2019 | Berchanskiy | H04L 45/22 |
| 2020/0310517 | A1* | 10/2020 | Li | G06F 1/3253 |
| 2020/0310999 | A1* | 10/2020 | Jeong | H04R 3/00 |
| 2021/0173756 | A1* | 6/2021 | Yoon | G06F 11/3041 |
| 2022/0283624 | A1* | 9/2022 | Bajpai | G06F 1/3253 |

* cited by examiner

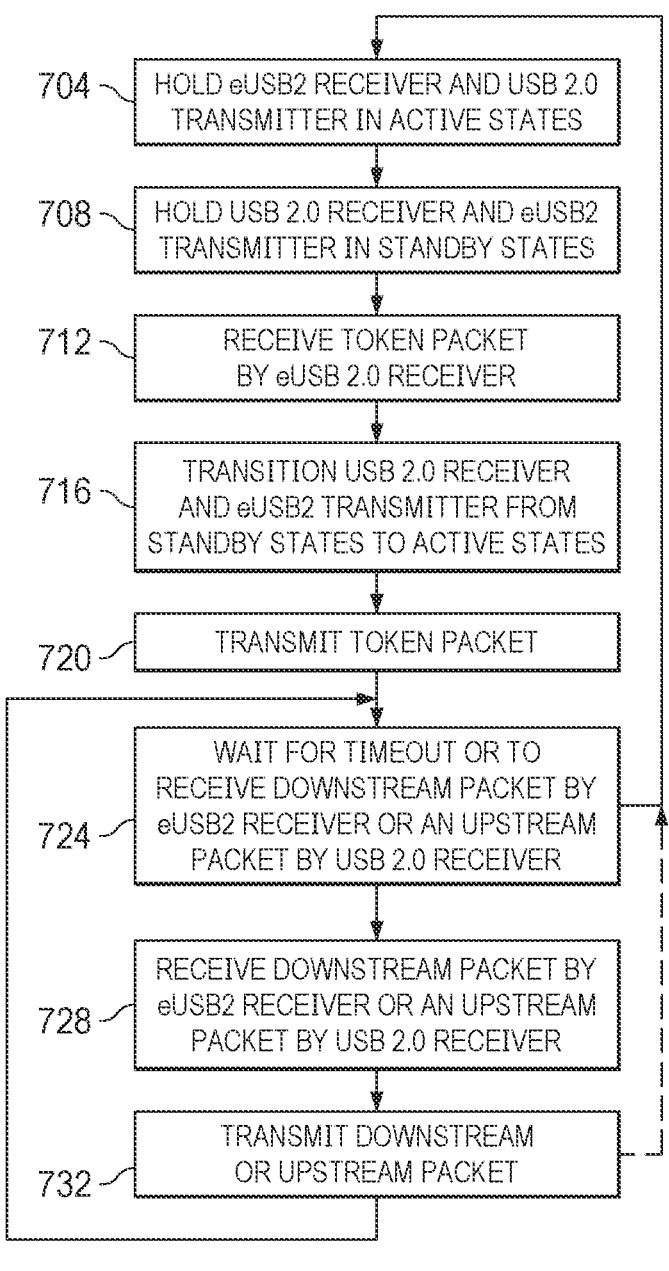

704 — HOLD eUSB2 RECEIVER AND USB 2.0 TRANSMITTER IN ACTIVE STATES

708 — HOLD USB 2.0 RECEIVER AND eUSB2 TRANSMITTER IN STANDBY STATES

712 — RECEIVE TOKEN PACKET BY eUSB 2.0 RECEIVER

716 — TRANSITION USB 2.0 RECEIVER AND eUSB2 TRANSMITTER FROM STANDBY STATES TO ACTIVE STATES

720 — TRANSMIT TOKEN PACKET

724 — WAIT FOR TIMEOUT OR TO RECEIVE DOWNSTREAM PACKET BY eUSB2 RECEIVER OR AN UPSTREAM PACKET BY USB 2.0 RECEIVER

728 — RECEIVE DOWNSTREAM PACKET BY eUSB2 RECEIVER OR AN UPSTREAM PACKET BY USB 2.0 RECEIVER

732 — TRANSMIT DOWNSTREAM OR UPSTREAM PACKET

FIG. 7

LOW POWER EMBEDDED USB2 (eUSB2) REPEATER

CROSS REFERENCE TO RELATED APPLICATION

This application claims priority to U.S. Provisional Application No. 63/131,872, filed Dec. 30, 2020, entitled "Response Based Low Power eUSB2 Redriver", which is hereby incorporated by reference in its entirety.

BACKGROUND

The disclosure generally relates to embedded USB2 (eUSB2) repeaters.

DESCRIPTION OF THE RELATED ART

Universal Serial Bus (USB) is a standard establishing specifications for connectors and communication protocols. As referred to herein, USB refers to any version of the USB specification (e.g., USB 2.0, USB 3.2 and USB 4.0). The USB standard is widely adopted and is utilized as a communication protocol among individual subsystems or circuits such as a system-on-a-chip (SoC), which may be an application processor unit (APU). Such implementations in subsystems and circuits are referred to as embedded USB2 or eUSB2. The APU is also referred to as a host device.

In SoCs, devices often operate at voltage levels that vary from those of conventional USB devices (e.g. around 3.3 volts) to voltages used for eUSB2 (e.g. around 1 to 1.2 volts), creating an impediment to direct communication between eUSB2 systems and legacy USB systems. To facilitate communication, an eUSB2 repeater is utilized as a bridge or a redriver between eUSB2 systems and legacy USB devices, or vice versa. The eUSB2 repeater translates between legacy USB signaling voltage levels (e.g., 3.3V) and eUSB2 signaling voltage levels (e.g., 1.0V, 1.2V).

The APU (host) generally includes an eUSB2 port which facilitates two-way communications for the APU according to voltage level specifications for eUSB2. The eUSB2 port includes two terminals: a positive data terminal (eD+); and a negative data terminal (eD−). The USB device includes a USB port which facilitates two-way communications for the APU according to voltage level specifications for USB. The USB port includes two terminals: a positive data terminal (D+); and a negative data terminal (D−).

According to the embedded USB2 standard, an eUSB2 repeater operating at high speed (HS) signaling rate is required to start transmitting HS packets on its USB 2.0 port within 4 HS unit intervals (UIs) (i.e., ~8 ns) after receiving a packet at its eUSB2 port and start transmitting on its eUSB2 port within 4 HS UIs after receiving a packet on its USB 2.0 port. Also, the USB 2.0 standard requires that a peripheral device (e.g., legacy USB device) can transmit to a host (e.g., APU) after receiving a packet from the host, and the peripheral device is required to transmit within 8 to 192 UIs after receiving a packet from the host. Thus, after the eUSB2 repeater receives and forwards a packet from the host, the eUSB2 repeater is required to be able to switch from an idle state to an active state and transmit data in the opposite direction after 8 UIs of idle time. To allow eUSB2 repeaters to switch from an idle state to an active state and transmit data in the opposite direction in 8 UIs, existing eUSB2 repeaters are implemented such that they consume the same amount of power in the idle state and in the active state.

SUMMARY

In one aspect, a method of operating an embedded universal serial bus (eUSB) repeater includes holding an eUSB receiver and a universal serial bus (USB) transmitter in active states, and holding a USB receiver and an eUSB transmitter in standby states. The method includes receiving by the eUSB receiver a token packet indicative of transmission of a first downstream packet, and transitioning the USB receiver and the eUSB transmitter from the standby states to the active states responsive to the token packet. The method includes transmitting the token packet by the USB transmitter.

In an additional aspect, the method includes receiving by the eUSB receiver a downstream packet or receiving by the USB receiver an upstream packet within a first timeout period after receiving the token packet, and transmitting the downstream packet by the USB transmitter or transmitting the upstream packet by the eUSB transmitter.

In an additional aspect, the method includes transitioning the USB receiver and the eUSB transmitter from the active states to the standby states if no packet is received within a first timeout period after receiving the token packet.

In an additional aspect, the method includes transitioning the USB receiver and the eUSB transmitter from the active states to the standby states if no packet is received within the first timeout period.

In an additional aspect, a method of operating an eUSB repeater includes holding a USB receiver and an eUSB transmitter in active states, and holding an eUSB receiver and a USB transmitter in standby states. The method includes receiving by the USB receiver a token packet indicative of transmission of a first downstream packet. The method includes transitioning the USB transmitter and the eUSB receiver from the standby states to the active states responsive to the token packet. The method includes transmitting the token packet by the eUSB transmitter.

In an additional aspect, the method includes receiving by the USB receiver a second downstream packet or receiving by the eUSB receiver an upstream packet within a first timeout period after receiving the token packet. The method includes transmitting the second downstream packet by the eUSB transmitter or transmitting the upstream packet by the USB transmitter.

In an additional aspect, the method includes transitioning the eUSB receiver and the USB transmitter from the active states to the standby states if no packet is received within the first timeout period.

BRIEF DESCRIPTION OF THE DRAWINGS

FIGS. 7 and 8 are flow diagrams of methods of an example embodiment.

The same reference numerals or other feature designators are used in the drawings to designate the same or similar (functionally and/or structurally) features.

DETAILED DESCRIPTION

Figures 1, 3:
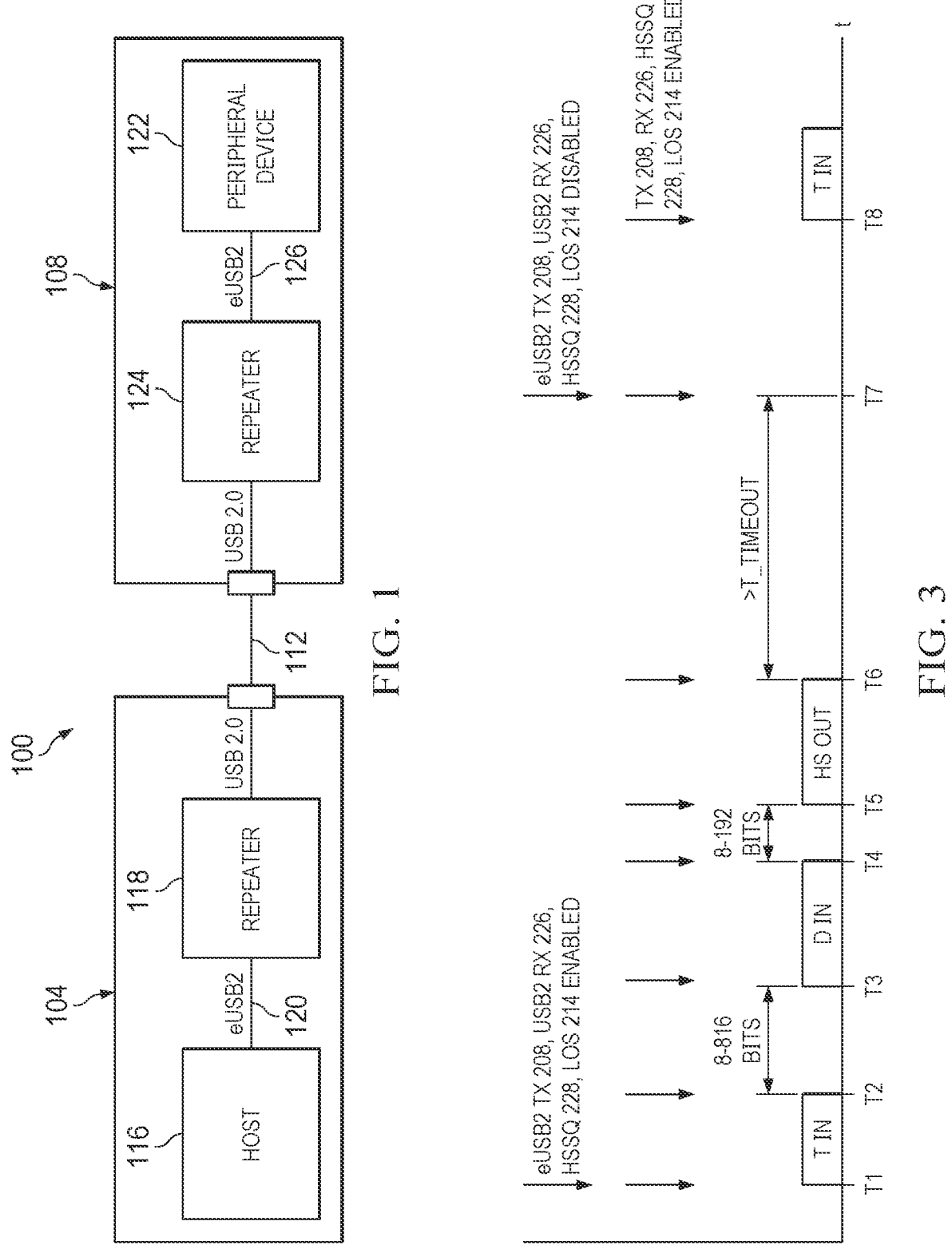
FIG. 1 is a block diagram of a system of an example embodiment.
FIG. 3 is a timing diagram of packet transmissions by the system of FIG. 1.

FIG. 1 is a block diagram of a system 100 of an example embodiment. The system 100 includes a host system 104 coupled to a peripheral system 108 over a USB 2.0 bus 112. The host system 104 includes a host device 116 coupled to an eUSB2 repeater 118 (also referred to as host-side repeater 118) over an eUSB2 bus 120. The peripheral system 108 includes a peripheral device 122 coupled to an eUSB2 repeater 124 (also referred to as peripheral-side repeater 124) over an eUSB2 bus 126. The host device 116 may include, for example, be an application processor unit (APU), a microcontroller unit (MCU), a general purpose processor, logic circuitry, memory, analog circuitry and/or a state machine. Including the peripheral-side repeater 124, the peripheral system 108 may include, for example, an external hard drive, a mouse, a printer, a keyboard, a display, logic circuitry, analog circuitry and/or a processor.

In an example embodiment, the USB 2.0 bus 112 is used as an external connection between the host system 104 and the peripheral system 108, the eUSB2 bus 120 is used to interconnect the eUSB2 repeater 118 (host-side repeater 118) and the host device 116, and the eUSB2 bus 126 is used to interconnect the eUSB2 repeater 124 (peripheral-side repeater 124) and the peripheral device 122.

In some example embodiments, the peripheral system 108 may include the peripheral-side repeater 124 and the host system 104 may not include the host-side repeater 118. In other embodiments, the host system 104 may include the host-side repeater 118 and the peripheral system 108 may not include the peripheral-side repeater 124.

In operation, the host device 116 transmits a downstream packet over the eUSB2 bus 120. The host-side repeater 118 converts the downstream packet from eUSB2 signaling voltage levels (e.g., around 1.0V to 1.2V) to USB 2.0 signaling voltage levels (e.g., around 3.3V) and transmits the downstream packet over the USB 2.0 bus 112. The peripheral-side repeater 124 receives the downstream packet and converts the downstream packet from USB 2.0 signaling voltage levels (e.g., around 3.3V) to eUSB2 signaling levels (e.g., around 1.0V to 1.2V) and transmits the downstream packet to the peripheral device 122 over the eUSB2 bus 126.

The peripheral device 122 may respond to the host device 116 with an upstream packet which is transmitted to the peripheral-side repeater 124 over the eUSB2 bus 126. The peripheral-side repeater 124 converts the upstream packet from eUSB2 signaling voltage levels to USB 2.0 signaling voltage levels and transmits the upstream packet over the USB 2.0 bus 112. The host-side repeater 118 receives the upstream packet and converts the upstream packet from USB 2.0 signaling voltage levels to eUSB2 signaling voltage levels and transmits the upstream packet to the host device 116 over the eUSB2 bus 120.

Figures 2, 4:
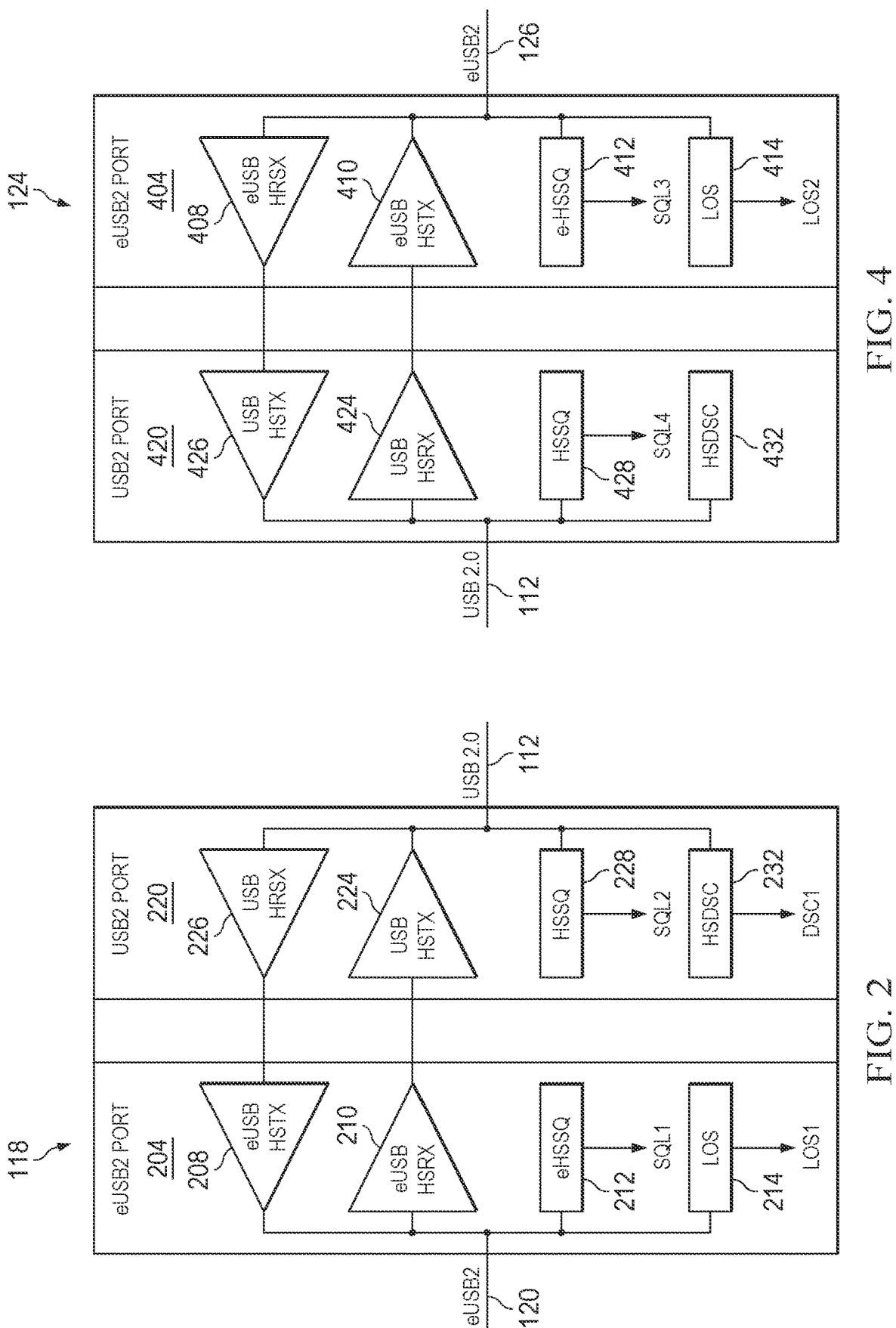
FIG. 2 is a block diagram of high speed components of a host-side repeater of an example embodiment.
FIG. 4 is a block diagram of high speed components of a peripheral-side repeater of an example embodiment.

FIG. 2 is a block diagram of high speed (HS) components of a host-side repeater 118 of an example embodiment. The host-side repeater 118 includes an eUSB2 port 204 configured to interface with the eUSB2 bus 120. The eUSB2 bus 120 provides a connection to the host device 116 (shown in FIG. 1). The eUSB2 port 204 includes an eUSB2 transmitter 208 and an eUSB2 receiver 210. The eUSB2 transmitter 208 transmits an upstream packet to the host device 116 over the eUSB2 bus 120. The eUSB2 receiver 210 receives a downstream packet from the host device 116 over the eUSB2 bus

120. In an example embodiment, the eUSB2 transmitter 208 and the eUSB2 receiver 210 are implemented with buffers.

The eUSB2 port 204 includes a high speed squelch circuit eHSSQ 212 which detects downstream packets on the eUSB2 bus 120. The eHSSQ 212 may detect the start of packet (SOP) of a downstream packet transmitted by the host device 116 over the eUSB2 bus 120 and in response provide a squelch signal SQL1 which is indicative of a downstream packet on the eUSB2 bus 120.

In an example embodiment, the eHSSQ 212 detects the presence of a differential voltage on data lines of the eUSB2 bus 120 (e.g. the D+ and D− data lines) and in response provides a squelch signal SQL1 which indicates that the host device 116 has placed a downstream packet on the eUSB2 bus 120.

The eUSB2 port 204 includes a loss of signal (LOS) circuit 214 which detects an end of packet (EOP) on the eUSB2 bus 120 and in response provides a LOS1 signal.

The host-side repeater 118 includes a USB 2.0 port 220 configured to interface with a USB 2.0 bus 112. The USB 2.0 bus 112 provides connection with the peripheral system 108 (shown in FIG. 1). The USB 2.0 port 220 includes a USB 2.0 transmitter 224 and a USB 2.0 receiver 226. The USB 2.0 receiver 226 receives an upstream packet from the peripheral system 108 over the USB 2.0 bus 112. The USB 2.0 transmitter 224 transmits a downstream packet to the peripheral system 108 over the USB 2.0 bus 112. In an example embodiment, the USB 2.0 transmitter 224 and the USB 2.0 receiver 226 are implemented with buffers. In some example embodiments, the eUSB2 port 204 operates at a different voltage (e.g. around 1 to 1.2 volts) than the USB2 port 220 (e.g. around 3 volts). In these embodiments, the repeater 118 may include isolation (e.g. galvanic isolation) between the eUSB2 port 204 and the USB2 port 220 so that these ports can operate at different voltages.

The USB 2.0 port 220 includes a high speed squelch circuit HSSQ 228 which detects upstream packets on the USB 2.0 bus 112. The HSSQ 228 may detect a start of packet (SOP) of an upstream packet transmitted by the peripheral system 108 over the USB 2.0 bus 112 and in response provide a squelch signal SQL2 which is indicative of an upstream packet.

In an example embodiment, the HSSQ 228 detects the presence of a differential voltage on the data lines of the USB 2.0 bus 112 (e.g. the D+ and D− data lines) and in response provides the squelch signal SQL2 which indicates that the peripheral system 108 has placed an upstream packet on the USB 2.0 bus 112.

The USB 2.0 port 220 includes a high speed disconnect detect circuit (HSDSC) 232 which monitors for removal of peripheral HS termination from the USB 2.0 bus 112. The HSDSC 232 provides a DSC1 signal if the peripheral device was disconnected from the USB 2.0 bus 112.

In an example embodiment, the eUSB2 bus 120 is continuously monitored for any downstream packets that may be transmitted by the host device 116. Thus, the eHSSQ circuit 212 is always held in an active state (i.e., enabled) to monitor the eUSB2 bus 120 for downstream packets.

In order to address the possibility that a downstream packet from the host device 116 may arrive anytime at the eUSB2 port 204, the eUSB2 receiver 210 and the USB 2.0 transmitter 224 are held in active states which allow them to be prepared to start repeating downstream packets immediately. In the active states, even while not transmitting a packet, the USB 2.0 transmitter 224 sources current continuously.

When directed by the host system 104, the peripheral system 108 (shown in FIG. 1) will start transmitting test packets repeatedly as defined by the USB 2.0 standard to enable compliance test of signal quality. This is referred to as a Device Test Packet Mode. During normal operation (i.e., not Device Test Packet Mode), according to USB 2.0 protocol, packet traffic is always initiated by the host device 116. Thus, except test packets, each upstream packet is transmitted by the peripheral device 122 only in response to downstream packets from the host device 116. Unless the host device 116 initiates with a downstream packet, the peripheral device 122 does not transmit an upstream packet.

In an example embodiment, the USB 2.0 receiver 226 and the eUSB2 transmitter 208 are held in standby states until a downstream packet is detected on the eUSB2 bus 120. The standby state is also referred to as the low-power state in which output current from the transmitter is shunted to ground.

When the eHSSQ circuit 212 detects a downstream packet on the eUSB2 bus 120, the USB 2.0 receiver 226 and the eUSB2 transmitter 208 are transitioned from the standby states to active states. Because the peripheral device 122 is required to respond with an upstream packet within 8 to 192 HS UIs after a downstream packet is transmitted by the host device 116, the USB 2.0 receiver 226 and the eUSB2 transmitter 208 are transitioned to the active states in order be ready to repeat packets in a timely manner.

By holding the USB 2.0 receiver 226 and the eUSB2 transmitter 208 in the standby states until a downstream packet is detected on the eUSB2 bus 120, significant reduction in power consumption is achieved. In an example embodiment, the system 100 achieved between 35% to 50% reduction in power consumption by holding the USB 2.0 receiver 226 and the eUSB2 transmitter 208 in the standby states until a downstream packet is detected.

In an example embodiment, the HSSQ circuit 228 and the LOS circuit 214 are held in standby states until a downstream packet is detected on the eUSB2 bus 120. When the eHSSQ circuit 212 detects a downstream packet on the eUSB2 bus 120, the HSSQ circuit 228 and the LOS circuit 214 are transitioned from the standby states to the active states. Because the peripheral device 122 is required to respond with an upstream packet within 8-192 HS UIs after the downstream packet is transmitted by the host device 116, the HSSQ circuit 228 and the LOS circuit 214 are transitioned to the active states to allow them to rapidly respond.

In an example embodiment, the HSDSC circuit 232 is held in a standby state by default. If the eHSSQ circuit 212 detects a downstream packet from the host device 116, the HSDSC circuit 232 is transitioned to an active state. Thus, if a downstream packet is detected, the HSDSC circuit 232 is enabled to monitor traffic and also be ready to detect a disconnect condition. Because, the HSDSC circuit 232 is held in standby state by default, additional power savings is achieved.

FIG. 3 is a timing diagram of packet transmissions when the host device 116 requests a data packet from the peripheral device 122. At time T1, the host device 116 begins transmission of an in-token packet (T IN) on the eUSB2 bus 120. In response, at time T1, the eUSB2 transmitter 208 and the USB 2.0 receiver 226 are transitioned from standby states to active states (e.g., enabled). Also at time T1, the HSSQ circuit 228 and the LOS circuit 214 are transitioned from standby states to active states (e.g., enabled).

At time T2, the host device 116 completes transmission of T IN. Within 8-816 UIs of completion of the transmission of T IN, the peripheral device 122 responds by starting transmission (shown as starting at time T3) of an upstream packet (D IN). At time T4, the transmission of D IN is completed. In some example embodiments, after transmitting an upstream packet, a timeout counter is started (e.g. at time T4). In other example embodiments, the eUSB2 transmitter 208, the USB 2.0 receiver 226, the HSSQ circuit 228 and the LOS circuit 214 are transitioned from active states to standby states (after D IN is transmitted, such as at time T4). Within 8-192 UIs of completion of transmission of the upstream packet D IN, at time T5, the host device 116 begins transmission of a handshake packet (HS OUT). In some embodiments in which a timeout counter started, it is reset. In some embodiments where the eUSB2 transmitter 208, the USB 2.0 receiver 226, the HSSQ circuit 228 and the LOS circuit 214 were transitioned to standby states at time T4, they are transitioned to active states when HS OUT is received by repeater 118 (e.g. at time T5). At time T6, the transmission is completed, a timeout counter is started, and the timeout counter expires after a first timeout period at time T7. In an example embodiment, the timeout period is based on a roundtrip time and a device response time as defined in the USB 2.0 standard. If there are no downstream packets transmitted by the host device 116 before the expiration of the first timeout period (shown as t timeout, the period between times T6 and T7), the USB 2.0 receiver 226, the eUSB2 transmitter 208, the HSSQ circuit 228, and the LOS circuit 214 are transitioned from the active states to the standby states. If the host device 116 transmits a downstream packet before the expiration of the first timeout period, the USB 2.0 receiver 226, the eUSB2 transmitter 208, the HSSQ circuit 228, and the LOS circuit 214 are held in the active states.

In the example of FIG. 3, the first timeout period expired at time T7 before any downstream packet was transmitted by the host device 116. Thus, at time T7 the USB 2.0 receiver 226, the eUSB2 transmitter 208, the HSSQ circuit 228 and the LOS circuit 214 are transitioned from the active states to the standby states. At time T8, the host device 116 transmits an in token T IN and in response the USB 2.0 receiver 226, the eUSB2 transmitter 208, the HSSQ circuit 228 and the LOS circuit 214 are transitioned from the standby states to the active states.

FIG. 4 is a block diagram of the high-speed (HS) components of the peripheral-side repeater 124 of an example embodiment. The peripheral-side repeater 124 includes an eUSB2 port 404 configured to interface with the eUSB2 bus 126. The eUSB2 bus 126 provides a connection to the peripheral device 122 (shown in FIG. 1). The eUSB2 port 404 includes an eUSB2 receiver 408 and an eUSB2 transmitter 410. The eUSB2 receiver 408 receives an upstream packet from the peripheral device 122 over the eUSB2 bus 126. The eUSB2 transmitter 410 transmits a downstream packet to the peripheral device 122 over the eUSB2 bus 126. In an example embodiment, the eUSB2 receiver 408 and the eUSB2 transmitter 410 are implemented with buffers.

The eUSB2 port 404 includes a high speed squelch circuit eHSSQ 412 which detects upstream packets on the eUSB2 bus 126. The eHSSQ 412 may detect the start of packet (SOP) of an upstream packet transmitted by the peripheral device 122 over the eUSB2 bus 126 and, in response, provide a squelch signal SQL3 which is indicative of an upstream packet on the eUSB2 bus 126.

In an example embodiment, the eHSSQ 412 detects the presence of a differential voltage on data lines of the eUSB2 bus 126 and, in response, provides a squelch signal SQL3 which indicates that the peripheral device 122 has placed an upstream packet on the eUSB2 bus 126. The eUSB2 port 404 includes a loss of signal (LOS) circuit 414 which detects an end of packet (EOP) on the eUSB2 bus 126 and in response provides a LOS2 signal.

The peripheral-side repeater 124 includes a USB 2.0 port 420 configured to interface with a USB 2.0 bus 112. The USB 2.0 bus 112 provides connection with the host device 116 (shown in FIG. 1). The USB 2.0 port 420 includes a USB 2.0 receiver 424 and a USB 2.0 transmitter 426. The USB 2.0 receiver 424 receives a downstream packet from the host device 116 over the USB 2.0 bus 112. The USB 2.0 transmitter 426 transmits an upstream packet to the host device 116 over the USB 2.0 bus 112. In an example embodiment, the USB 2.0 receiver 424 and the USB 2.0 transmitter 426 are implemented with buffers. In some example embodiments, the eUSB2 port 404 operates at a different voltage (e.g. around 1 to 1.2 volts) than the USB2 port 420 (e.g. around 3 volts). In these embodiments, the repeater 124 may include isolation (e.g. galvanic isolation) between the eUSB2 port 404 and the USB2 port 420 to isolate the ports so that these ports can operate at different voltages.

The USB 2.0 port 420 includes a high speed squelch circuit HSSQ 428 which detects downstream packets on the USB 2.0 bus 112. The HSSQ 428 may detect a start of packet (SOP) of a downstream packet transmitted by the host device 116 and in response provide a squelch signal SQL4 which is indicative of the downstream packet.

In an example embodiment, the HSSQ 428 detects the presence of a differential voltage on the data lines of the USB 2.0 bus 112 and in response provides the squelch signal SQL4 which indicates that an upstream packet is placed on the USB 2.0 bus 112.

The USB 2.0 port 420 includes a high speed disconnect HSDSC circuit 432 which in some example embodiments is not needed for peripherals because USB 2.0 compliant peripherals do not detect disconnect through the data lines of the USB 2.0 bus.

In an example embodiment, the USB 2.0 bus 112 is continuously monitored for any downstream packets that may be transmitted by the host system 104. Thus, the HSSQ circuit 428 is held in an active state (i.e., enabled) to monitor the USB 2.0 bus 112 for downstream packets. In order to address the possibility that a downstream packet from the host device 116 may arrive at anytime at the USB 2.0 port 420, the USB 2.0 receiver 424 and the eUSB2 transmitter 410 are held in active states which allow them to be ready to repeat downstream packets. In the active states, current is driven to a load by the USB 2.0 receiver 424 and the eUSB2 transmitter 410.

According to USB 2.0 protocol, traffic is initiated by the host device 116. Thus, upstream packets are transmitted by the peripheral device 122 only in response to downstream packets. Unless the host device 116 initiates with a downstream packet, the peripheral device 122 does not respond with an upstream packet.

In an example embodiment, the eUSB2 receiver 408 and the USB 2.0 transmitter 426 are held in standby states until a downstream packet is detected on the USB 2.0 bus 112. The standby state is also referred to as the low-power state in which output current from the transmitter is shunted to ground.

When the HSSQ circuit 428 detects a downstream packet on the USB 2.0 bus 112, the eUSB2 receiver 408 and the USB 2.0 transmitter 428 are transitioned from the standby states to active states. Because the peripheral device 122 is required to respond with an upstream packet within 8-192 HS UIs after a downstream packet is transmitted by the host device 116, the eUSB2 receiver 408 and the USB 2.0 transmitter 426 are transitioned to the active states in order be ready to repeat upstream packets.

By holding the eUSB2 receiver 408 and the USB 2.0 transmitter 426 in the standby states until a downstream packet is detected on the USB 2.0 bus 112, significant reduction in power consumption can be achieved. In an example embodiment, the system 100 achieved between 35% to 50% reduction in power consumption by holding the eUSB2 receiver 408 and the USB 2.0 transmitter 426 in the standby states until a downstream packet is detected.

In some embodiments, the eHSSQ circuit 412 is held in an active state to address the possibility that the peripheral device 122 may send a test packet anytime without being prompted by the host device 116. The LOS circuit 414 may be held in a standby state until a downstream packet is detected on the USB 2.0 bus 112. When the HSSQ circuit 428 detects a downstream packet on the USB 2.0 bus 112, the LOS circuit 414 is transitioned from the standby state to the active state. Because the peripheral device 122 is required to respond with an upstream packet within 8-192 HS UIs after the downstream packet is transmitted by the host device 116, the LOS circuit 414 is transitioned to the active state to allow it to rapidly respond.

In an example embodiment, the HSDSC circuit 432 is always powered off. The HSDSC circuit 432 is used by host devices to detect disconnect. Notwithstanding if the HSSQ circuit 428 detects a downstream packet from the host device 116, the HSDSC circuit 432 remains off. In some example embodiments, the repeaters of FIG. 2 or FIG. 4 may be used to implement repeaters 118 and/or 124.

Figure 5:
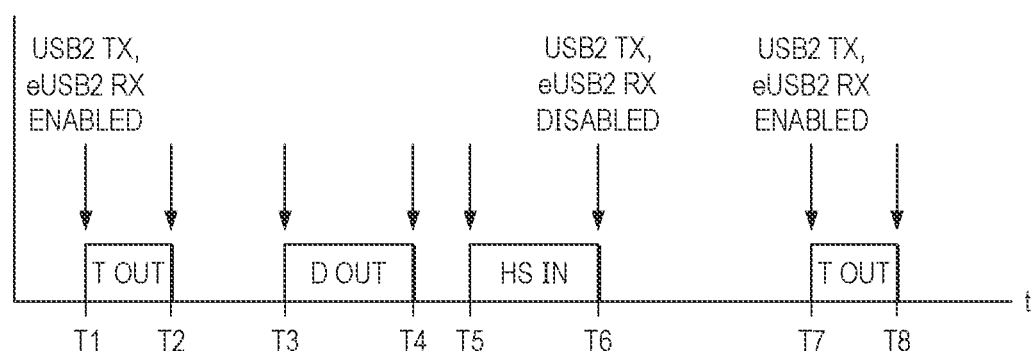
FIGS. 5 and 6 are timing diagrams of packet transmissions by the system of FIG. 1.

FIG. 5 is a timing diagram of packet transmissions when the host device 116 sends data packets to the peripheral device 122. At time T1, the host device 116 starts to send an out token (T OUT) which indicates the host device 116 is going to send data packets to the peripheral device 122. In response (e.g. shown at time T1), the USB 2.0 transmitter 426 and the eUSB2 receiver 408 are transitioned from standby states to active states (i.e., enabled). At time T2, the transmission of T OUT is completed. Within 8-192 HS UIs after T2 (shown at time T3) the host device 116 begins transmission of a data packet D OUT and the transmission is completed at time T4. Within 8-192 HS UIs after T4 (shown at time T5), the peripheral device 122 begins transmission of a handshake packet HS IN indicating the data packet D OUT is successfully received by the peripheral device 122. At time T6, transmission of HS IN is completed, and the eUSB2 receiver 408 and the USB 2.0 transmitter 426 are transitioned from the active states to the standby states. In alternative example embodiments, after transmitting the upstream packet, a timeout counter is started instead of entering standby states (starting, for example, at time T6). At time T7, the host device 116 sends another out token (T OUT). In response, in an embodiment where the USB 2.0 transmitter 426 and the eUSB2 receiver 408 were in standby, they are transitioned to active states. In another embodiment, where a timeout counter was started, it is reset. The transmission of the out token T OUT is completed at time T8.

Figure 6:
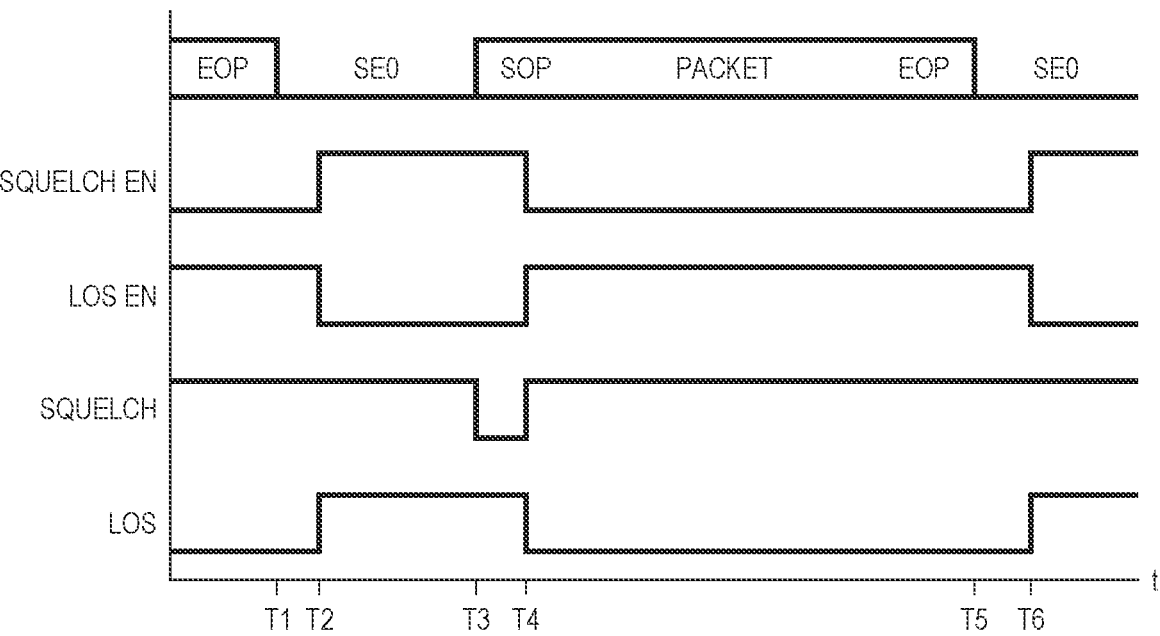

In some example embodiments, in order to further reduce power consumption, the eHSSQ circuit 212 is disabled after the detection of a start of packet (SOP) and is enabled after the detection of an end of packet (EOP), and the LOS circuit 214 is disabled after the detection of an EOP and is enabled after the detection of a SOP. FIG. 6 is a timing diagram of packet transmissions in the system 100 and actions by the eHSSQ circuit 212 and the LOS circuit 214 of an example embodiment. By selectively enabling and disabling the eHSSQ circuit 212 and the LOS circuit 214, power consumption is further reduced, thus improving efficiency.

At time T1, the host device 104 completes transmission of a downstream packet which is indicated by an end of packet (EOP) on the eUSB2 bus 120. As a result, the data lines of the eUSB2 bus 120 are both at a low state which is indicated by the graph SE0 (single ended zero). Thus, the eUSB2 bus 120 is in an idle state.

At time T2, the eHSSQ circuit 212 is enabled which is indicated by the graph Squelch EN transitioning to a high state. At time T2, the LOS1 signal (FIG. 1) is asserted which is indicated by the graph LOS transitioning to a high state because the eUSB2 bus 120 is in an idle state. In addition, the LOS circuit 214 is disabled (which is indicated by the graph LOS EN transitioning to a low state), because the eUSB2 bus 120 is in an idle state.

At time T3, the eHSSQ circuit 212 detects a start of packet (SOP) which indicates that the host device 104 has transmitted a downstream packet. In response, the eHSSQ circuit 212 provides a pulse low signal (SQL1) indicated by the graph Squelch transitioning to a low state for a short duration and then returning to a high state at time T4.

At time T4 the eHSSQ circuit 212 is disabled which is indicated by the graph Squelch EN transitioning to a low state. At time T4 the LOS circuit 214 is enabled which is indicated by LOS EN graph transitioning to a high state and the LOS signal (LOS1) is de-asserted. The time delay between T3 and T4 is due to analog circuit delay which must be shorter than a minimum packet length.

At time T5, the host device 104 completes transmission (via, for example, line 120) of the downstream packet which is indicated by an EOP. At time T6, the eHSSQ circuit 212 is enabled again (as indicated by the Squelch EN signal transitioning to a high state). Also at time T6, the LOS circuit 214 is disabled (as indicated by the LOS EN signal transitioning to a low state) and the LOS signal is asserted.

The LOS circuit 214 detects end of packet (EOP). Once EOP is detected, the LOS circuit 214 can be disabled until the next packet is detected (based on, for example, the detection of a state of packet identifier) by the eHSSQ circuit 212. Thus, after EOP, the LOS circuit is turned off and the eHSSQ circuit is turned on. This way, the eHSSQ circuit 212 is ready to detect the next SOP when it arrives.

In the example of FIG. 4, the eHSSQ circuit 412 is enabled after an EOP identifier is received and is disabled after a SOP identifier is received. Conversely, the LOS circuit 414 is enabled after a SOP identifier is received and is disabled after an EOP identifier is received. By not enabling the eHSSQ circuit 412 and the LOS circuit 414 concurrently, power consumption is reduced.

FIG. 7 is a process flow diagram 700 of various steps executed by the host-side repeater 118 of an example embodiment. In block 704, the eUSB2 receiver 210 and the USB 2.0 transmitter 224 are held in active states (e.g. they are enabled). As discussed above, even while not transmitting a packet, the eUSB2 receiver 210 and the USB 2.0 transmitter 224 sources current continuously while in an active state.

In block 708, the USB 2.0 receiver 226 and the eUSB2 transmitter 208 are held in standby states. The standby state is also referred to as the low-power state in which output current from the transmitter may be shunted to ground.

In block 712, a token packet is received by the eUSB2.0 receiver 210. The token packet is indicative of transmission of a first downstream packet by the host device 116. In block 716, responsive to the token packet the USB 2.0 receiver 226 and the eUSB2 transmitter 208 are transitioned from the standby states to the active states. In block 720, the token packet is transmitted by the USB 2.0 transmitter 224.

In block 724, the repeater 118 waits for a first timeout period to receive a downstream packet by the eUSB2 receiver 210 or to receive an upstream packet by the USB 2.0 receiver 226.

If the timeout period expires without receiving a downstream or an upstream packet, the process returns to block 704. If a downstream or an upstream packet is received within the timeout period, the process moves to block 728. In block 732, the downstream packet is transmitted by the USB 2.0 transmitter 224 or the upstream packet is transmitted by the eUSB2 transmitter 208, and the process returns to block 724. In some example embodiments, after an upstream packet is transmitted by the eUSB2 transmitter 208, the process returns to block 704, instead of returning to block 724.

Figure 8:
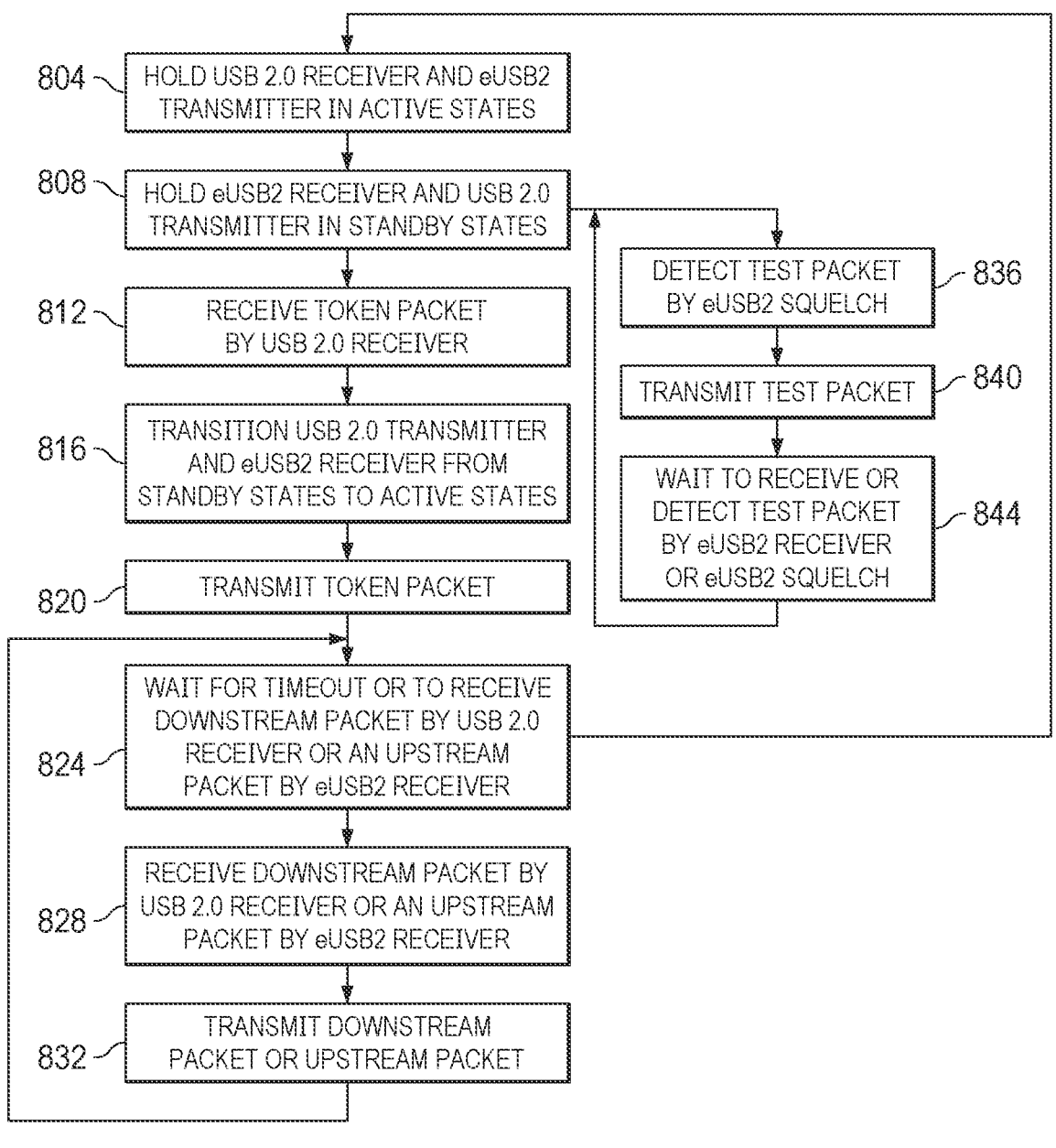

FIG. 8 is a process flow diagram 800 of various steps executed by the peripheral-side repeater 124 of an example embodiment. In block 804, the USB 2.0 receiver 424 and the eUSB2 transmitter 410 are held in active states. In block 808, the eUSB2 receiver 408 and the USB 2.0 transmitter 426 are held in standby states.

In block 812, a token packet is received by the USB 2.0 receiver 424. The token packet is indicative of transmission of a first downstream packet by the host device 116. In block 816, the USB 2.0 transmitter 426 and the eUSB2 receiver 408 are transitioned from the standby states to the active states. In block 820, the token packet is transmitted by the eUSB2 transmitter 410.

In block 824, the repeater 124 waits for a first timeout period to receive a downstream packet by the USB 2.0 receiver 428 or an upstream packet by the eUSB2 receiver 408. If the first timeout period expired before receiving a downstream or an upstream packet, the process returns to block 804. If a downstream packet or an upstream packet is received within the first timeout period, the process moves to block 828. In block 832, the downstream packet or the upstream packet is transmitted, and the process returns to block 824 in which the repeater 124 waits for a time period to receive another downstream packet or an upstream packet.

If in block 808, a test packet is received or is detected while the eUSB2 receiver 408 and the USB 2.0 transmitter 426 are held in standby states, the process moves to block 836. Next, in block 840, the test packet is transmitted, and the process moves to block 844 in which the repeater 124 waits to receive another test packet. If another test packet is received, the process returns to block 836.

Figure 9:
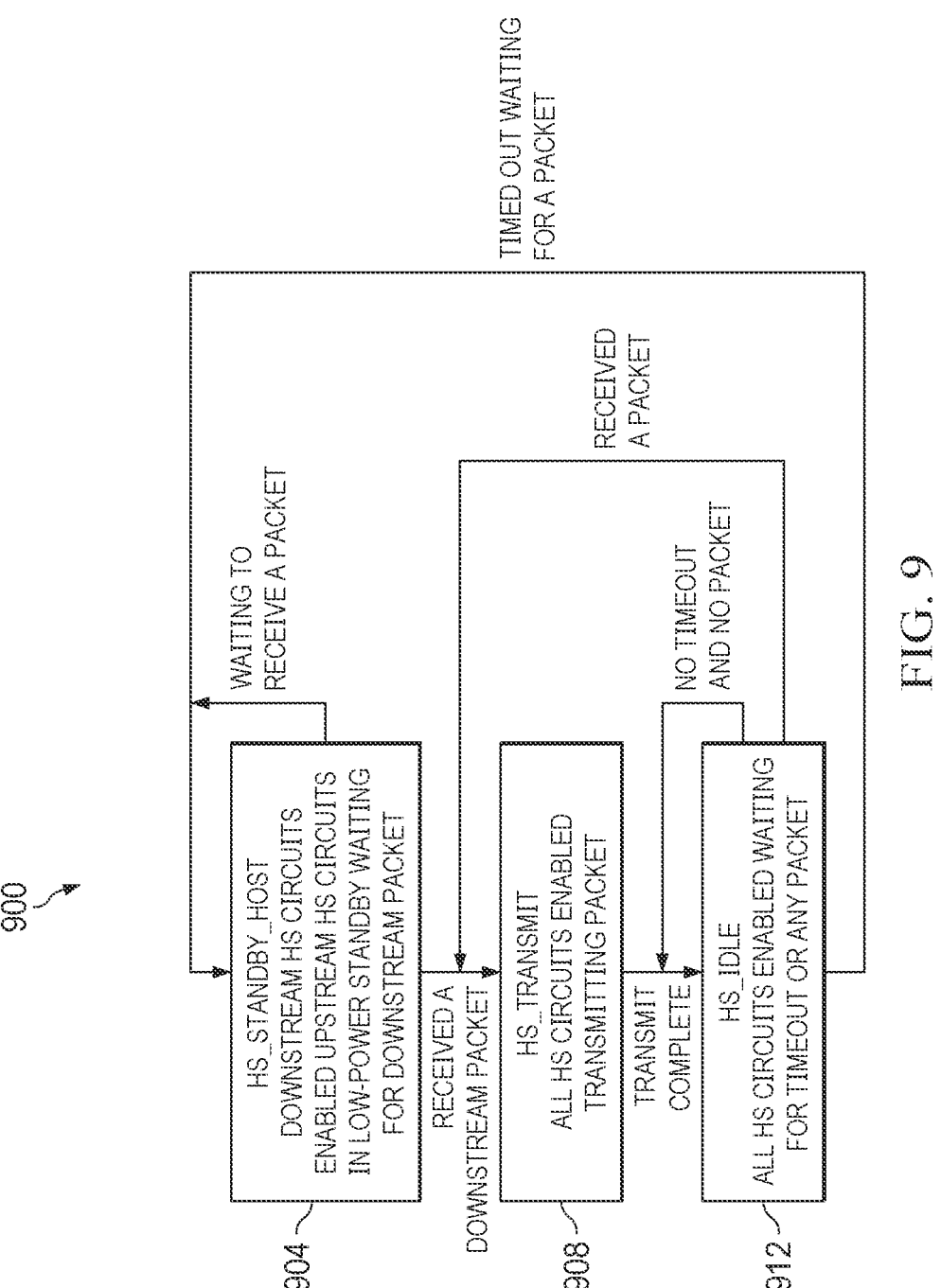
FIGS. 9 and 10 are state diagrams of a finite state machine (FSM) implemented to control host-side and peripheral-side repeaters.

FIG. 9 is a state diagram 900 of various states of a finite state machine (FSM) implemented to control the host-side repeater 118 of an example embodiment. The FSM transitions from one state to another in response to some inputs.

In state 904 (HS Standby), the eUSB2 receiver 210, the eHSSQ 212, and the USB 2.0 transmitter 224 are held in active states; and the eUSB2 transmitter 208, the HSSQ 208, the HSDSC 232 and the USB 2.0 receiver 226 are held in standby states. In state 912, the repeater 118 awaits a downstream packet.

If a downstream packet is received by the eUSB2 receiver 210, the FSM transitions to state 908 (HS Transmit). In state 908, the USB 2.0 receiver 226, the HSDSC 232, the HSSQ 228 and the eUSB2 transmitter 208 are transitioned to the active states, and the downstream packet is transmitted. After completion of the transmission, the FSM transitions to state 912 (HS Idle).

In state 912, the eUSB2 transmitter 208 and the USB 2.0 receiver 226 are idle and the eUSB2 receiver 210, the eHSSQ 212, the USB 2.0 transmitter 224, the eUSB2 transmitter 208, the HSSQ 228, the HSDSC 232 and the USB 2.0 receiver 226 remain enabled and the repeater 118 awaits any packet. If a packet is not received within a timeout period, the USB 2.0 receiver 226, the HSSQ 228, the HSDSC 232 and the eUSB 2.0 transmitter 208 are transitioned from the active states to the standby states, and the FSM returns to state 904. If a packet is received within the timeout period, the FSM returns to state 908 in which the packet is transmitted.

Figure 10:
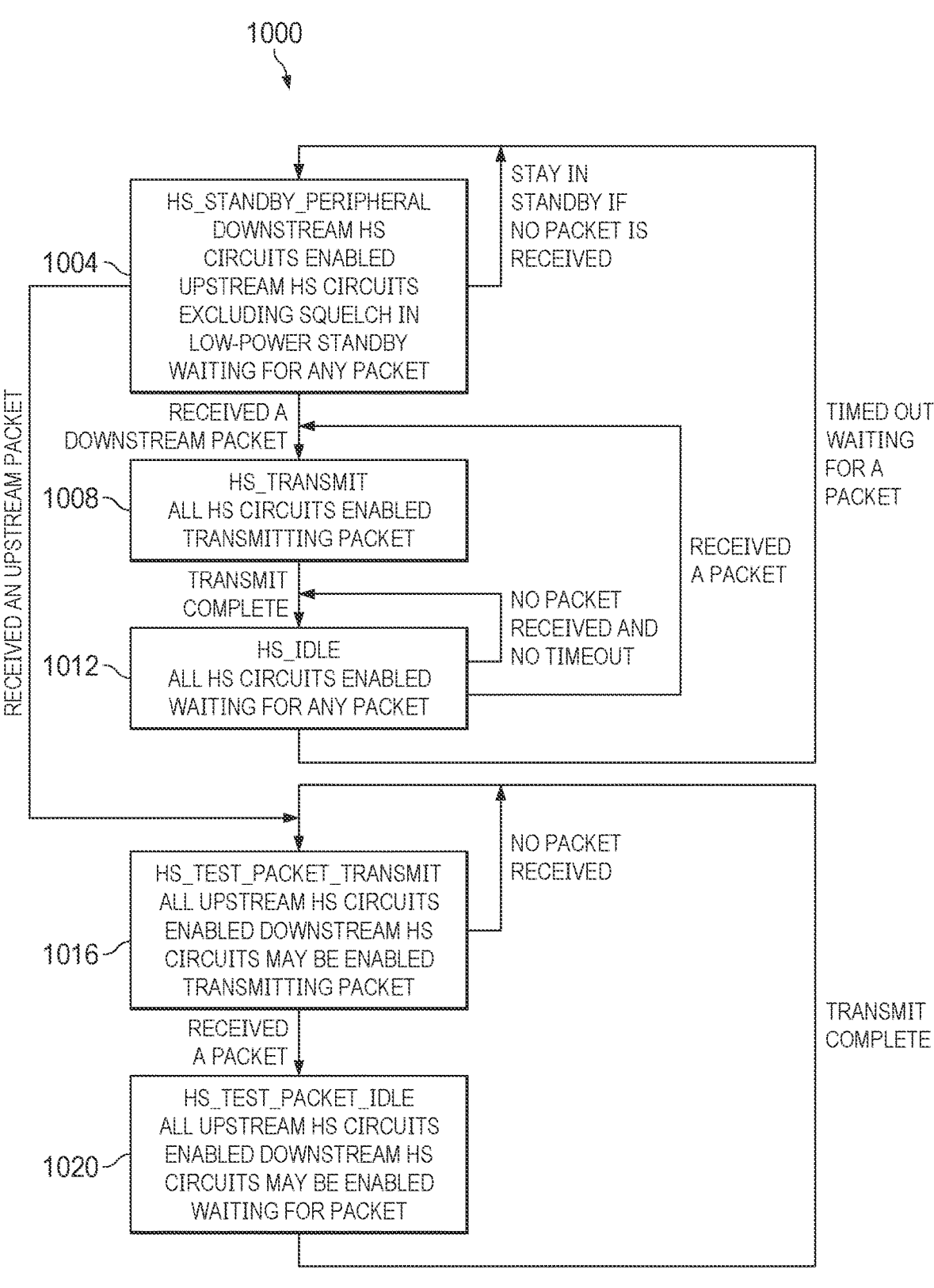

FIG. 10 is a state diagram 1000 of various states of a finite state machine (FSM) implemented to control the peripheral-side repeater 124 of an example embodiment. In state 1004 (HS Standby), the USB 2.0 receiver 424, the HSSQ 428 and the eUSB2 transmitter 410 are held in active states, and the eUSB2 receiver 408, the eHSSQ 412, the LOS 414, the HSDSC 432 and the USB 2.0 transmitter 426 are held in standby states while the repeater 124 waits to receive a packet. If a downstream packet is received, the FSM transitions to state 1008 (HS Transmit). Else, if an upstream packet is received, the FSM transitions to state 1016 (HS Test Packet Transmit).

In state 1008 (HS Transmit) the eUSB2 receiver 408, the HSSQ 428, and the USB 2.0 transmitter 426 are transitioned to the active states, and the downstream packet is transmitted. After completion of the transmission of the downstream packet, the FSM transitions to state 1012 (HS Idle).

In state 1012 (HS Idle), the eUSB2 bus 126 and the USB 2.0 bus 112 are idle, and the eUSB2 receiver 408, the eHSSQ 412, the HSSQ 428, the USB 2.0 transmitter 426, the USB 2.0 receiver 424 and the eUSB2 transmitter 410 are held in active states. Also, in state 1012, the repeater 124 awaits any packet. If a packet is not received within a first timeout period, the FSM transitions to state 1004 (HS Standby). Else, if a packet is received with a first timeout period, the FSM transitions to state 1008 (HS Transmit).

In state 1016 (HS Test Packet Transmit), the received upstream packet is transmitted. After transmission completes, the FSM moves to state 1020 (HS Test Packet Idle).

In state 1020 (HS Test Packet Idle) the eUSB2 and USB 2.0 buses are idle while the FSM awaits the next upstream test packet, and the eUSB2 receiver 408, the HSSQ 412, the USB 2.0 transmitter 426 and optionally the LOS 414, the eUSB2 transmitter 410, the USB 2.0 receiver 424 and the HSSQ 428 are held in active states. No downstream packets are expected, but if a test packet is received, the FSM returns to state 1016 (HS Transmit).

Although the example embodiments of the present disclosure are described with reference to USB 2.0 and eUSB2, the principles discussed herein are applicable to any versions of USB and to any versions of eUSB.

In the foregoing discussion and in the claims, the terms "including" and "comprising" are used in an open-ended fashion, and thus should be interpreted to mean "including, but not limited to . . . ." An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground"

or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "approximately" preceding a value means +/−10 percent of the stated value. As used herein, the term "modulate" shall also mean "to vary" or "to change." As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component. While some example embodiments suggest that certain elements are included in an integrated circuit while other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method of operating an embedded universal serial bus (eUSB) repeater, comprising:
   holding an eUSB receiver and a universal serial bus (USB) transmitter in active states while holding a USB receiver and an eUSB transmitter in standby states, wherein the USB transmitter couples to the eUSB receiver so as to receive downstream packets from the eUSB receiver, and wherein the eUSB transmitter couples to the USB receiver so as to receive upstream packets from the USB receiver;
   receiving by the eUSB receiver a token packet indicative of transmission of a first downstream packet; and
   transitioning the USB receiver and the eUSB transmitter from the standby states to the active states responsive to receiving the token packet.

2. The method of claim 1, further comprising transmitting the token packet by the USB transmitter.

3. The method of claim 2, further comprising:
   receiving by the eUSB receiver the first downstream packet or receiving by the USB receiver an upstream packet within a first timeout period after receiving the token packet; and
   transmitting the first downstream packet by the USB transmitter or transmitting the upstream packet by the eUSB transmitter.

4. The method of claim 2, further comprising transitioning the USB receiver and the eUSB transmitter from the active states to the standby states if no packet is received within a first timeout period after receiving the token packet.

5. The method of claim 3, further comprising transitioning the USB receiver and the eUSB transmitter from the active states to the standby states if no packet is received within the first timeout period.

6. The method of claim 3, further comprising holding the USB receiver and the eUSB transmitter in the active states if a packet is received within the first timeout period.

7. The method of claim 3, further comprising transitioning the USB receiver and the eUSB transmitter from the active states to the standby states if a last packet transmitted was an upstream packet.

8. The method of claim 1, wherein the eUSB repeater is a host-side repeater.

9. The method of claim 1, further comprising:
holding a high-speed disconnect circuit in a standby state; and
transitioning the high-speed disconnect circuit from the standby state to an active state responsive to receiving the token packet.

10. The method of claim 1, further comprising:
holding a USB squelch circuit in a standby state; and
transitioning the USB squelch circuit from the standby state to an active state responsive to receiving the token packet.

11. The method of claim 10, further comprising:
holding an eUSB loss of signal (LOS) detection circuit in the standby state; and
transitioning the eUSB LOS detection circuit from the standby state to the active state in response to detecting the first downstream packet by an eUSB squelch circuit.

12. A method of operating an embedded universal serial bus (eUSB) repeater, comprising:
activating a universal serial bus (USB) receiver and an eUSB transmitter, wherein the eUSB transmitter couples to the USB receiver so as to receive downstream packets from the USB receiver;
receiving, by the USB receiver, a token packet indicative of transmission of a first downstream packet; and
transitioning a USB transmitter and an eUSB receiver from a standby state to an active state responsive to receiving the token packet, wherein the USB transmitter couples to the eUSB receiver so as to receive upstream packets from the eUSB receiver.

13. The method of claim 12, further comprising transmitting the token packet by the eUSB transmitter.

14. The method of claim 13, further comprising:
receiving by the USB receiver a second downstream packet or receiving by the eUSB receiver an upstream packet within a first timeout period after receiving the token packet; and
transmitting the second downstream packet by the eUSB transmitter or transmitting the upstream packet by the USB transmitter.

15. The method of claim 14, further comprising transitioning the eUSB receiver and the USB transmitter from the active states to the standby states if no packet is received within the first timeout period.

16. The method of claim 12, further comprising transitioning the eUSB receiver and the USB transmitter from the active states to the standby states if no packet is received within a first timeout period.

17. The method of claim 14, further comprising holding the eUSB receiver and the USB transmitter in the active states if a packet is received within the first timeout period.

18. The method of claim 12, wherein the eUSB repeater is a peripheral-side repeater.

19. The method of claim 12, further comprising:
holding an eUSB squelch circuit in the active state;
detecting by the eUSB squelch circuit an upstream packet; and
transitioning the USB transmitter and the eUSB receiver from the standby states to the active states responsive to the detection of the upstream packet.

20. The method of claim 19, comprising holding the eUSB receiver and the USB transmitter in the active states.

21. The method of claim 12, further comprising holding a high-speed disconnect circuit in a standby state.

22. The method of claim 12, further comprising:
holding an eUSB squelch circuit in the standby state; and
transitioning the eUSB squelch circuit from the standby state to the active state responsive to the token packet.

23. The method of claim 12, further comprising:
holding an eUSB loss of signal (LOS) detection circuit in the standby state; and
transitioning the eUSB LOS detection circuit from the standby state to the active state responsive to a detection of an upstream packet by an eUSB squelch circuit.

24. A method of operating a repeater having a first input/output (I/O), a second I/O, a first transmitter, a second transmitter, a first receiver, and a second receiver, the method comprising:
holding the first receiver and the first transmitter in active states while holding second receiver and the second transmitter in standby states;
receiving by the first receiver a token packet indicative of transmission of a downstream packet;
transitioning the second receiver and the second transmitter from the standby states to the active states responsive to receiving the token packet;
receiving by the first receiver the downstream packet or receiving by the second receiver an upstream packet within a first timeout period after receiving the token packet; and
transmitting the downstream packet by the first transmitter or transmitting the upstream packet by the second transmitter.

25. The method of claim 24, further comprising transitioning the second receiver and the second transmitter from the active states to the standby states if no packet is received within a first timeout period after receiving the token packet.

26. The method of claim 24, wherein the repeater is a host-side repeater.

27. A method of operating an embedded USB2 (eUSB2) repeater, comprising:
holding a USB 2.0 receiver and an eUSB2 transmitter in active states while holding an eUSB2 receiver and a USB 2.0 transmitter in standby states;
receiving by the USB 2.0 receiver a token packet indicative of transmission of a first downstream packet;
transitioning the USB 2.0 transmitter and the eUSB2 receiver from the standby states to the active states responsive to the token packet;
receiving by the USB 2.0 receiver a second downstream packet or receiving by the eUSB2 receiver an upstream packet within a first timeout period after receiving the token packet;
transmitting the second downstream packet by the eUSB2 transmitter or transmitting the upstream packet by the USB 2.0 transmitter; and transitioning the eUSB2 receiver and the USB 2.0 transmitter from the active states to the standby states if no packet is received within the first timeout period.

28. The method of claim 27, wherein the eUSB2 repeater is a peripheral-side repeater.

* * * * *